Aug. 27, 1968    J. E. HUDSON ETAL    3,398,755
CARWASHING EQUIPMENT
Filed Oct. 7, 1966

INVENTORS.
John E. Hudson and
Forest J. Swineford

Frease & Bishop
ATTORNEYS

3,398,755
CARWASHING EQUIPMENT
John E. Hudson, Wooster, and Forest J. Swineford, Ashland, Ohio, assignors to Water Supplies, Inc., Ashland, Ohio, a corporation of Ohio
Filed Oct. 7, 1966, Ser. No. 585,077
2 Claims. (Cl. 134—58)

The invention relates to washing equipment for automobiles, and more particularly to automatic equipment which may be coin-control operated for washing motor vehicles and which has a simplified construction eliminating the primary sources of trouble and reasons for equipment servicing heretofore encountered in prior carwashing equipment.

Prior automatic or coin-controlled carwashing equipment with which a customer may automatically wash his automobile by depositing coins in the required amount at a control station heretofore has involved the use of a washing head, carriage or unit which travels in an oval path or loop about a car located at a washing station, either along an endless oval track in the floor, or along a suspended overhead endless oval track. Washing cycle operation is programmed so that the washing head moves continuously around the loop in one direction a number of times for the complete washing cycle and then stops ready for movement in the same direction to carry out successive washing cycles. The next coin-controlled automatic operation repeats the first by movement of the washing head in the same direction a number of times completely around the loop.

The movable washing unit normally includes electrically powered mechanisms as well as a water spray boom. All prior devices, whether the washing unit moves in an endless loop on the floor or on an overhead track have required a power collector of some type to supply electric power to the movable washing unit, and also have required a complicated rotatable hose coupling for the hose means connected with the spray boom so that the unit and spray boom may move repeatedly around the endless track loop.

Such prior constructions have encountered repeated and continuing difficulties with the power collector and hose coupling. These devices have been a constant source of trouble requiring repeated and constant servicing.

Furthermore, movement of the washing unit around the loop normally has been stopped by switch means in the control circuit adapted to operate when the unit has traversed the loop several times after carrying out the various operations in the cycle and has arrived at a stop station location. However, in use the washing unit has had the tendency to coast, when stopping after traversing the loop at the end of the washing cycle. Such coasting may only involve a small distance at any one time, but the amount of coasting movement is cumulative with successive washing operations and may finally result in the unit stopping at some undesirable location, say one-quarter of the way around the loop, rather than in the zone or area where it is intended that the unit shall stop.

Accordingly, objectives of the invention are to provide new automatic carwashing equipment which eliminates a power collector; which may use a simple, serviceable hose swivel for the liquid carrier boom connection; which eliminates the past frequent sources of trouble requiring frequent servicing; which has fewer parts, a longer life and a lower initial cost; which is safer in use because of the elimination of problems concerning the supply of electricity and water to the washer head unit; which eliminates the unit coasting problem indicated; and which eliminates difficulties heretofore encountered, achieves the stated objects simply, effectively and inexpensively, and solves problems and satisfies existing needs.

These and other objects and advantages apparent from the following description may be obtained, the stated results achieved and the described difficulties overcome by the structures, devices, elements, arrangements, parts and combinations which comprise the present invention, the nature of which is set forth in the following general statement, a preferred embodiment of which—illustrative of the best mode in which applicants have contemplated applying the principles—is set forth in the following description and shown in the drawings and which are particularly and distinctly pointed out and set forth in the appended claims.

The nature of the improved carwashing equipment may be stated generally as including, endless oval-path loop track means; a washing carriage suspended from and movable in either direction around the endless track loop including carriage drive means for driving the carriage around the loop in either direction; control means including a source of power and reversing means for the drive means; a spray boom carried by the carriage; a collectorless power cable between the drive means and power control means; and a pair of limit switches operative to reverse the direction of carriage movement after each movement of the carriage completely around the loop, mounted adjacent one another at a stop station, engageable by the carriage and connected with the power cable, carriage drive means and control means; whereby carriage movement is stopped by actuation of one of the limit switches at the stop station each time that the carriage moves around the loop, and the direction of carriage movement is reversed for the next carriage loop movement of the carriage on the track.

By way of example, the improved carwashing equipment is shown diagrammatically in the accompanying drawing forming part hereof in which.

Similar numerals refer to similar parts throughout the various figures of the drawings.

Figure 1:
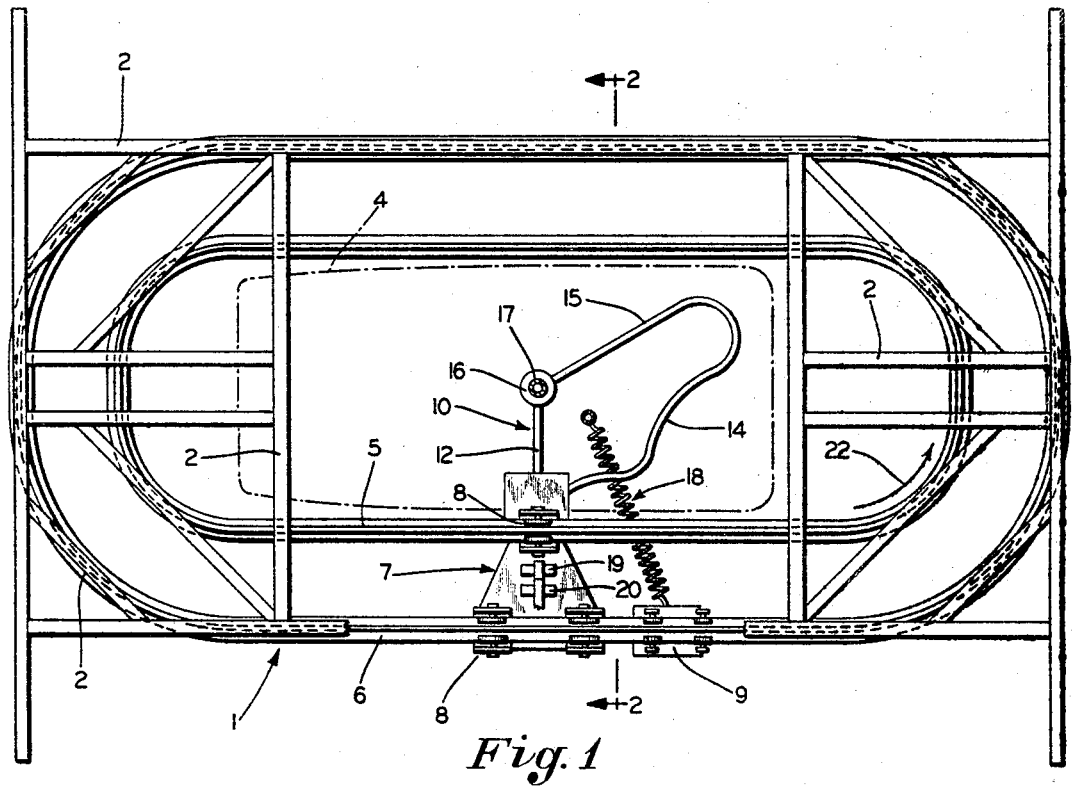
FIGURE 1 is a diagrammatic plan view of the improved equipment.

The improved carwashing equipment is generally indicated at 1 and includes a frame structure 2 located at a required distance above a floor 3 to accommodate the equipment and an auto designated at 4 to be washed by the equipment. An endless overhead conveyer track loop formed by inner and outer rails 5 and 6 is suspended from the frame 2 so that the track loops 5 and 6 define an oval-path. A washing carriage generally indicated at 7 is mounted for movement on the tracks 5 and 6 by usual roller suspension means 8 typically used in overhead conveyers. Carriage 7 may include a tractor drive unit 9 for driving the carriage 7 around the loop in either direction. A spray boom generally indicated at 10 is suspended from the carriage 7 and may include a vertical spray pipe 11 and a connected horizontal spray pipe 12 adapted to spray the adjacent side and top portions of the car 4.

Spray boom 10 is supplied with water or washing solution from suitable sources through a supply conduit 13 mounted on carriage 7 which may be connected by a flexible hose 14 with a supply pipe 15 mounted on a swivel connector 16 carried at the lower end of central supply manifold 17. Supply manifold 17 is connected with suitable pumps, tanks, sources of hot and cold water, cleaning solution, etc., normally located in an adjacent room which may serve one or more units of carwashing equipment.

A collectorless power cable generally indicated at 18 is connected between the carriage drive unit 9 and power control means for the equipment (not shown) which may be located elsewhere on a control panel and which may include a source of power and reversing means for the drive means.

Figure 2:
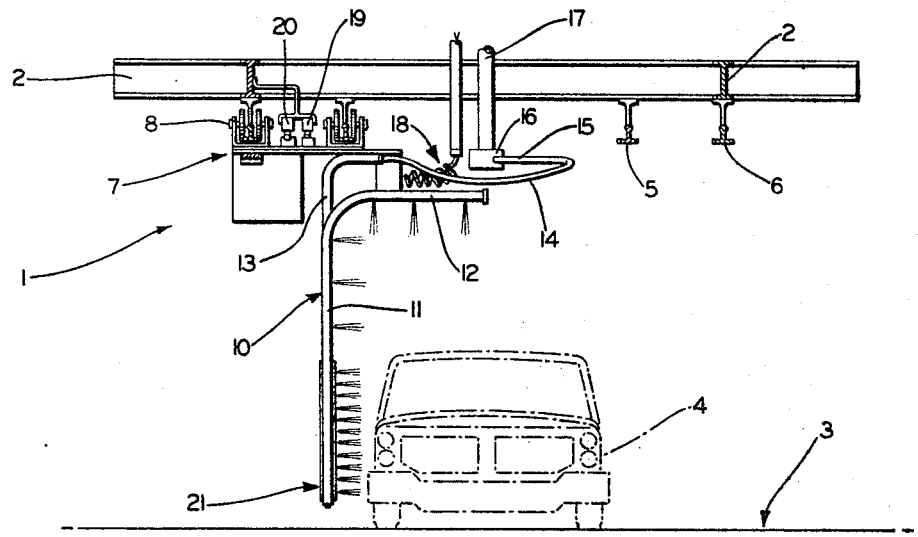
FIG. 2 is a diagrammatic end elevation illustrating the equipment in use.

A pair of limit switches 19 and 20 is mounted adjacent a stop station indicated at 21 in FIG. 2 with switches 19 and 20 adjacent one another and engageable by the carriage 7. The limit swiches 19 and 20 are connected with the power cable 18 and through the power cable with the carriage drive unit 9 and the control means.

The electrical control means circuitry including the limit switches 19 and 20 source of power and reversing means for the drive unit 9 is arranged in a usual manner and operable so that the carriage drive unit 9 is stopped by actuation of one of the limit switches 19 or 20 at the stop station 21, for example, by the limit switch 19 when the carriage 7 is moving in the direction of the arrow 22 of FIG. 1, as the carriage completes movement once around the track loop. Upon stopping the carriage, the control means is operable for movement of the carriage drive unit 9 and the carriage 7 around the track loop in the reverse direction and the carriage again stops at the stop station 21 by actuation of limit switch 20 when the carriage moves in the direction opposite to that of the arrow shown at 22.

The carriage 7 thus continues to move back and forth around the loop, first in one direction and then in the other direction during the carwashing cycle.

Normally, a washing cycle may include operation of the carriage around the loop, first in one direction and back around the loop to station 21 during which washing solution is jet-sprayed at high velocity against the auto 4. Carriage movement in one direction around the loop and then back around the loop in reverse direction is then repeated for the rinsing operation to complete the washing cycle. Additional carriage movements back and forth around the loop may be added to the washing cycle if desired.

In accordance with the concepts of the invention, the carriage will always stop at the stop station 21 at one side of the location of the car to be washed regardless of whether or not the carriage may coast slightly upon stopping by actuation of one of the limit switches. A slight coast at the end of each cycle of washing operations cancels out and is not cumulative because of the reversal of carriage movement during operation of the equipment.

Furthermore, because of the reversal of carriage movement, it is unnecessary to provide any electrical collector construction for the power cable 18 because the cable does not continue to wind round and round due to continued movement around the loop in one direction, which is avoided. The elimination of power collector means eliminates one of the major sources of trouble and causes for repair and maintenance in the operation of automatic carwashing equipment.

Furthermore, the reversal of carriage movement also enables a simple and rugged swivel connector 16 of usual construction which will not leak, to be used for the supply pipe 15. Thus, more complicated forms of rotatable couplings in the liquid supply line are avoided, likewise avoiding a source of trouble and maintenance.

As indicated, the equipment may be actuated in any desired manner by usual coin-operated actuators (not shown).

Accordingly, the present invention provides improved and simplified carwashing equipment which eliminates the primary sources of trouble and reasons for equipment servicing heretofore encountered in prior art washing equipment; which avoids the coasting problem for washing heads heretofore used which travel continuously in one direction around an endless loop; which eliminates a power collector and utilizes a simple, serviceable hose swivel for the liquid supply; which has fewer parts, a longer life and a lower initial cost; and which avoids difficulties heretofore encountered, achieves the stated objects simply and effectively, and solves problems existing in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details, sizes, etc., shown.

Having now described the features, discoveries and principles of the invention, the construction of the new carwashing equipment, the characteristics thereof and the new, advantageous and useful results obtained; the new and useful structures, devices, elements, arrangements, parts, combinations and mechanical equivalents obvious to those skilled in the art are set forth in the appended claims.

We claim:

1. In carwashing equipment, endless loop track means, a washing carriage mounted on and movable in either direction around the endless track loop, carriage drive means for driving the carriage around the loop in either direction, control means including a source of power and reversing means for the drive means, a spray boom carried by the carriage, means for supplying washing liquid to the spray boom during carriage movement, a collectorless power cable connected between the carriage drive means and power control means, and a pair of limit switches operative to reverse the direction of carriage movement after each movement of the carriage completely around the loop; said limit switches being mounted adjacent one another at a stop station, being engageable by the carriage, and being connected with the power cable, carriage drive means and control means; whereby carriage movement is stopped by actuation by one of the limit switches at said stop station each time that the carriage moves completely around the loop, and the direction of carriage movement is reversed for the next carriage loop movement of the carriage on the track.

2. In carwashing equipment, endless loop track means, a washing carriage mounted on and movable in either direction around the endless track loop, means for driving the carriage around the loop in either direction, control means including a source of power and means for reversing the direction of movement of the drive means, a spray head mounted on and movable with the carriage, means for supplying washing liquid to the spray head during carriage movement, a collectorless power cable connected between the drive means and power control means, and the control means including means actuated upon arrival of the carriage at a stop station after movement of the carriage in one direction completely around the loop to stop carriage movement at the stop station and to operate the reversing means to reverse drive means movement to drive the carriage in the reverse direction completely around the loop; said arrival actuated means being mounted adjacent the stop station and actuated by the carriage, and being connected with the power cable and carriage drive means.

References Cited

UNITED STATES PATENTS

| 1,756,066 | 4/1930 | Pineles. |
| 2,676,600 | 4/1954 | Vani et al. 134—123 |
| 2,896,857 | 7/1959 | Tompkins 134—123 XR |
| 3,167,797 | 2/1965 | Hergonson 134—123 XR |
| 3,208,088 | 9/1965 | Sulzberger et al. 134—123 XR |

FOREIGN PATENTS

| 375,182 | 6/1932 | Great Britain. |

ROBERT L. BLEUTGE, *Primary Examiner.*